United States Patent [19]

Patel et al.

[11] Patent Number: 5,134,118
[45] Date of Patent: Jul. 28, 1992

[54] AQUEOUS BASED DRILLING FLUID

[75] Inventors: Arvind D. Patel, Houston; Henry C. McLaurine, Katy, both of Tex.

[73] Assignee: M-I Drilling Fluids Company, Houston, Tex.

[21] Appl. No.: 659,826

[22] Filed: Feb. 22, 1991

Related U.S. Application Data

[63] Continuation-in-part of Ser. No. 432,786, Nov. 6, 1989, abandoned.

[51] Int. Cl.$^5$ .................. C09K 7/02; C08F 228/02
[52] U.S. Cl. ............................. 507/121; 507/119; 507/120; 507/140; 252/8.551; 252/8.554; 526/287
[58] Field of Search ............... 252/8.551, 8.554, 8.512, 252/8.511, 8.513, 8.514; 526/240, 241, 287; 507/119, 120, 121

[56] References Cited

U.S. PATENT DOCUMENTS

| Re. 28,474 | 7/1974 | Anderson et al. | 252/8.551 X |
|---|---|---|---|
| 2,911,365 | 11/1959 | Burland et al. | |
| 3,039,529 | 6/1962 | McKennon | |
| 3,230,201 | 1/1966 | Hart et al. | |
| 3,434,970 | 3/1969 | Siegele | |
| 3,768,565 | 10/1973 | Persinski et al. | |
| 3,907,927 | 9/1975 | Guilbault | |
| 3,953,342 | 4/1976 | Martin et al. | |
| 4,076,628 | 2/1978 | Clampitt | |
| 4,146,690 | 3/1979 | Tago et al. | |
| 4,357,245 | 11/1982 | Engelhardt et al. | |
| 4,482,682 | 11/1984 | Kudomi et al. | |
| 4,502,966 | 3/1985 | Giddings et al. | 252/8.5 |
| 4,547,299 | 10/1985 | Lucas | 252/8.514 |
| 4,555,558 | 11/1985 | Giddings et al. | 526/287 |
| 4,652,623 | 3/1987 | Chen et al. | 526/287 |
| 4,659,793 | 4/1987 | Yang | 526/91 X |
| 4,678,591 | 7/1987 | Giddings et al. | 252/8.514 |
| 4,702,319 | 10/1987 | Bock et al. | 252/8.554 |
| 4,741,843 | 5/1988 | Garvey et al. | 252/8.514 |
| 4,770,795 | 9/1988 | Giddings et al. | 252/8.514 |
| 4,812,544 | 3/1989 | Sopko et al. | 526/73 |
| 4,959,432 | 9/1990 | Fan et al. | 526/287 |
| 5,032,295 | 7/1991 | Matz et al. | 252/8.514 X |
| 5,039,433 | 8/1991 | Sopko et al. | 252/8.551 |

OTHER PUBLICATIONS

Gray, G. R., et al., Composition and Properties of Oil Well Drilling Fluids, pp. 547–576, 4th Ed., Gulf Publishing Company, Houston, Texas (Aug. 1981).
J. Poly. Sci. Vol. 38, pp. 274–275 (1959).
Kuo, J., et al., A Method of Calculating Copolymerization Reactivity Ratios, J. App. Poly. Sci., vol. 26, 1117–1128 (1981).

Primary Examiner—John S. Maples
Assistant Examiner—C. Sayala
Attorney, Agent, or Firm—Arnold, White & Durkee

[57] ABSTRACT

This invention relates to an improved aqueous based drilling fluid and specifically to a water soluble polymer that imparts desirable performance characteristics to the final drilling fluid. The invention also relates to the method for preparation of the polymer and drilling fluid. The water soluble polymer is especially useful in that it exhibits superior tolerance to divalent cations, salts, solids and elevated temperatures when added to aqueous drilling fluids. The polymer additive is characterized by increased viscosity at low shear rates and improved fluid loss control thereby exhibiting superior rheological and thixotropic properties. The polymer consists of reaction products of sulfonated monomers and monomers added to enhance the functional characteristics of the polymer.

4 Claims, No Drawings

AQUEOUS BASED DRILLING FLUID

CROSS REFERENCE TO RELATED APPLICATION

This application is a continuation-in-part of commonly assigned, co-pending patent application U.S Ser. No. 432,786 filed Nov. 6, 1989, now abandoned.

BACKGROUND OF THE INVENTION

1. Field of the Invention

The invention relates to improved drilling fluids used in the drilling of subterranean oil and gas wells as well as other drilling fluid applications and drilling procedures.

In rotary drilling there are a variety of functions and characteristics that are expected of a drilling fluid ("drilling mud" or simply "mud"). The drilling fluid is expected to carry cuttings from beneath the bit, transport them up the annulus, and permit their separation at the surface while at the same time the rotary bit is cooled and cleaned. A drilling mud is also intended to reduce friction between the drill string and the sides of the hole while maintaining the stability of uncased sections of the borehole. Likewise the drilling fluid is formulated to prevent unwanted influxes of formation fluids from permeable rocks penetrated and likewise to form a thin, low permeability filter cake which seals pores and other openings and formations penetrated by the bit. Finally, the drilling fluid is used to collect and interpret information available from drill cuttings, cores and electrical logs.

Drilling fluids are typically classified according to their base material. In water based muds, solid particles are suspended in water or brine. Oil can be emulsified in the water. Nonetheless, the water is the continuous phase. Oil based muds are exactly the opposite. Solid particles are suspended in oil and water or brine is emulsified in the oil and therefore the oil is the continuous phase. The final class of drilling fluids are pneumatic fluids in which drill cuttings are removed by a high velocity stream of air or natural gas. On both offshore and inland drilling barges and rigs, drill cuttings are conveyed up the hole by a drilling fluid.

It is apparent to anyone selecting or using a drilling fluid for oil and gas exploration that an essential component of a selected fluid is that it be properly balanced to achieve the necessary characteristics for the specific end application. As stated hereinabove, the typical compositions include oil based muds, water based muds and pneumatic fluids. For purposes of this application, only oil and water based mud systems will be relevant. The vast majority of oil and gas exploration is done with water based muds. The primary reason for this preference is price and environmental compatibility. Traditional oil based muds made from diesel or mineral oils, while being substantially more expensive than water based drilling fluids, are environmentally incompatible. As a result, the use of oil based muds has been historically limited to those situations where they are necessary.

The preferred embodiment of this invention relates to a novel aqueous drilling fluid including a novel mixture of water soluble monomers after polymerization. A general problem has been recognized in that commercially available additives to drilling fluids have demonstrated unsatisfactory stability when used in fluids that are highly contaminated, for example, with sea water. The consequent instability severely decreases the functional characteristics of the drilling fluid system. Specifically, the viscosity, gel strength, filtrate loss and contamination control characteristics of the drilling fluid are often not maintained within acceptable ranges.

Various water soluble polymers have been synthesized or otherwise developed, and certain polymers are known to occur naturally, some of which have shown at least a limited ability to control the viscosity, gel strength and filtrate loss of aqueous drilling fluids. However the ionic sensitivity and/or temperature stability of these materials is unacceptable, making their use in drilling activities of limited value. During the drilling of certain deep wells, i.e., in excess of fifteen thousand feet, or drilling in geographic areas of high geothermal activity, the viscosity, gel strength and fluid loss of the drilling fluid are adversely affected as a function of the elevated temperature. The noted functional characteristics are consequently outside acceptable ranges.

The drilling fluid itself is an essential item in the oil-well drilling system. In rotary well drilling, the principal functions performed by the drilling fluid are to carry cuttings from beneath the drill bit, transport the cuttings from the annulus and permit their separation at the surface.

The drilling fluid, or drilling mud as it is more typically called, also cools and cleans the drill bit, reduces friction between the drill string and sides of the drill hole and maintains the stability of uncased sections of the borehole. Annular hole cleaning and maintaining wellbore stability are always prominent concerns when developing drilling fluids.

It is essential that the drilling fluid formulation be such that it will prevent the inflow of fluids, such as oil, gas or water, from the permeable rock formations which have been penetrated or which are being penetrated.

The drilling fluid should also contain additives which permit the formation of a thin, low permeability filter cake which seals pores and other openings in the formations which are penetrated by the bit. Finally, the drilling mud must assist in the collection and interpretation of information available from drill cuttings, cores, and electrical logs.

There are certain limitations which are placed on the formulation of muds (drilling fluids) for actual commercial use. The drilling fluids must be formulated such that they are not injurious to the drilling personnel and not damaging or offensive to the environment. The drilling fluids must not cause unusual or expensive methods of completion of the drilled hole nor interfere with normal productivity of the fluid bearing formation. Finally, it is essential that the drilling fluid not corrode or cause excessive wear to drilling equipment. From these requirements has arisen the need for specialized drilling fluid additives as essential components of drilling muds and therefore drilling fluid systems which will assist the drilling mud formulation in the performance of these various functions.

The effectiveness of a drilling fluid and in particular the additives found in the drilling fluid are evaluated by measurement of certain characteristics of the drilling system. The viscosity, gel strength, filtrate loss, contamination control and tolerance to divalent ion characteristics of drilling fluids and drilling systems are all directly attributable to the components of the drilling fluid or drilling mud. These properties, their definitions and a general explanation is found in a comprehensive treatise entitled Composition and Properties of Drilling and Completion Fluids, 5th Ed., George R. Gray and H. D. H. Darley, Gulf Publishing Company, (1988).

One of the essential ingredients of the drilling fluid of this invention is a polymer that enhances the functional capability of the entire drilling fluid system. In formulating a polymer for use as a drilling fluid additive, it is thus necessary to consider the desired functional characteristics of the drilling fluid. The polymers that have shown utility in the drilling fluid of this invention show relatively less sensitivity to salts, divalent cations or solids and therefore better retain their functional properties when compared to current commercially available polymers.

The first essential characteristic of the drilling fluid which is controlled by the polymer additive of this invention is its viscosity. The viscosity of drilling fluids is very difficult to control because of the adverse conditions under which drilling fluids are used as well as the excessively elevated temperatures to which they will be exposed. In this regard, during the drilling of certain deep wells, i.e., greater than 15,000 feet, it is common to be exposed to temperatures at which thermal decomposition of certain drilling fluid additives occurs. These temperatures can easily cause a severe change in the viscosity of the drilling fluid and thus adversely affect the flow characteristics of the drilling mud and adversely affect the overall drilling operation. Such viscosity modification at these temperatures is not acceptable in normal drilling fluids. Additionally, certain areas of the country have excessive geothermal activity resulting in extremely high temperatures. The effect on drilling fluids at these geothermally elevated temperatures may be similar to the effect of elevated temperatures in deep wells.

In any event it is necessary that the viscosity of the drilling fluid be controlled within desired ranges, which are in many instances dependent on the geographic area of activity. The viscosity is a function of plastic viscosity and yield point. As a general rule, as the mud weight increases, the plastic viscosity increases, but the yield point increases by a much smaller magnitude.

A second essential characteristic is the gel strength of the drilling fluid. Gel strength is a characteristic of the drilling fluid which reflects the ability of the drilling fluid to maintain a suspension of additives and drill cuttings, especially when circulation is stopped. As can be appreciated, if circulation of the drilling fluid were terminated, and if all of the suspended cuttings and additives to the drilling fluid were then permitted to settle to the lowest point the drill bit and drill string would be literally packed into a position that would require severe levels of torque to rotate. Such torque might damage components of the drill string or in some instances, cause the drill string to shear apart. Such a situation results in loss of the drill bit and sustained periods where positive footage is not being drilled.

If the drilling fluid gel strength is too low, it is typically increased by adding bentonite. Ideally, the drilling fluid gel strength should be just high enough to suspend barite and drill cuttings when circulation is stopped. Higher drilling fluid gel strengths are undesirable because they retard the separation of cuttings and of entrained gas at the surface, and also because they raise the pressure required to reestablish circulation after changing bits. Furthermore, when pulling pipe, a high gel strength may reduce the pressure of the mud column beneath the bit because of a swabbing action. If the reduction in pressure exceeds the differential pressure between the mud and the formation fluids, the fluids will enter the hole, and possibly cause a blowout. Similarly, when running pipe into the hole, the downward motion of the pipe causes a pressure surge which may, when conditions are critical, cause fracturing with consequent loss of circulation. Methods have been developed for calculation of the magnitude of these pressure surges.

Related to the gel strength control is the ability of the drilling fluid to tolerate divalent ions. Typically, dispersants are used to reduce the gel strength of fresh water or low salinity muds. The use of some types of such dispersants has an unfortunate secondary effect, i.e., the replacement of calcium or other polyvalent cations on clay cuttings by the sodium used to solubilize these particular thinners. This tends to disperse the clay into small particles, some of which are not removed at the surface, and are again recycled until they are reduced to colloidal size. This action makes the control of viscosity very difficult and expensive when drilling through colloidal clay formations with a fresh water mud. The dispersive effect of the sodium ion may be offset by the addition of a calcium compound or else by the use of a polymer brine mud.

During drilling operations, it is always anticipated that the drilling fluid will be contaminated with various materials. Some of the potential contaminants are damaging to the ionic balance and viscosity of the drilling fluid. Such impurities include sodium chloride, gypsum as well as other minerals, magnesium and the like. The drilling fluid additive of this invention displays a high tolerance to divalent cations and ions, especially calcium and magnesium.

Another essential function of the drilling fluid is its ability to seal permeable formations exposed by the bit with a low permeability filter cake. Fluid loss from the borehole is therefore reduced. In order for a filter cake to form it is essential that the drilling fluid contain particles of a size only slightly smaller than that of the pore openings of the formation. These particles are trapped in the surface pores while finer particles are carried deeper into the formation. The particles which are deposited on the formation are known as the filter cake.

It is essential to control the permeability of the filter cake. This permeability depends on the particle size distribution of solids suspended in the drilling fluid and on electrochemical conditions. In general, the more particles there are in the colloidal size range, the lower the cake permeability. The presence of soluble salts in clay bearing muds increases the permeability of the filter cake sharply. Filtration performance in the well is rountinely judged by means of the standard American Petroleum Institute filtration test. In this test, the mud is subjected to static filtration through filter paper for thirty minutes, and the volume of filtrate and the cake thickness are then measured.

Within any specific drilling fluid and drilling system it is necessary to carefully control the filtrate loss within predesigned tolerance ranges. These tolerance ranges will vary from geographic area to geographic area depending on the type of formations encountered.

Oil and water base muds have contrasting attributes and disadvantages. Although drilling fluids utilizing an oil based mud inhibit wellbore swelling by minimizing dispersion fluid, the environmental toxicity of oil muds often overshadow the positive features. Oil base systems can be created with low toxicity but all systems are pollutants to varying degrees. In addition, the cost parameters of an oil mud are often prohibitive when compared to a water based system. Furthermore, the rheological and thixotropic character of an oil mud is not as versatile for maximized hole cleaning as certain aqueous fluids.

Cost effectiveness and environmental acceptability are major advantages of an aqueous drilling fluid but one major disadvantage also exists. Swelling and/or dispersion of formation clays causes general instability of the wellbore with resultant hole enlargement.

Inhibitive materials such as lime, gypsum, tannates and tannate/chrome lignosulfonate systems are used to minimize the factors causing an unstable wellbore.

Due to their chemical nature, these materials require frequent maintenance treatments and/or sufficient sodium hydroxide for solubilization. The resultant hydroxide radical ion causes the dispersion of the clay material. The degree of dispersion is proportional to the hydroxide radical concentration. The dispersion is a major cause of the high solids content of tannate and chrome lignosulfonate systems. A high quantity of low gravity solids content has detrimental effects on another parameter also. There is direct correlation between high quantities of low gravity solids content and reduced rates of penetration.

In an effort to minimize the dispersion and swelling of the formation clays by an aqueous drilling fluid, systems have been developed which rely heavily on polymers and/or soluble salts for inhibition of swelling and/or dispersion of clays. Examples of the polymers used are derivatives such as partially hydrolyzed polyacrylamide ("PHPA") type or polyacrylamide-acrylate copolymers. The aqueous phase can be composed of potassium, sodium or calcium chloride brine, sea water or fresh water.

The mechanism of stabilization achieved by the polymers is not entirely understood. The more successful polymers are anionic polyelectrolytes which are adsorbed at the positive sites of the clay particle. Theoretically, the polymer is adsorbed at multiple points binding the clay material together creating an encapsulation effect.

Alkaline hydrolysis and thermal stability of drilling fluids, and specifically the polymers in drilling fluids, has long been acknowledged as a severe problem in formulating drilling fluid additives. Examples of such drilling fluid additives which are available commercially are PHPA (partially hydrolyzed polyacrylamide) as well as modified starches and cellulose. The partially hydrolyzed (30%) polyacrylamide (PHPA) polymer has become increasingly popular over the last few years. The reasons are varied: (1) promotion of shale inhibition; (2) ease of handling; (3) cost effectiveness; and (4) environmental acceptability. However, the PHPA products are very susceptible to alkaline hydrolysis, particularly at high temperatures.

The polymers that have demonstrated utility in the drilling fluid of this invention are relatively tolerant to such alkaline hydrolysis and hence demonstrate a superior thermal stability during actual use conditions. Polyanionic starches and cellulose products are susceptible to the same thermal stability problems as PHPA. PHPA products are also susceptible to divalent cations and other electrolytes such as sodium chloride.

Although fresh water drilling systems utilizing the PHPA polymer additive offer good shear thinning properties in the higher shear rate range, in the presence of electrolytes and cations, i.e., sea water environment, a significant reduction in the carrying capacity in the low shear rate range occurs. The dynamic carrying capacity which is related to the static suspension qualities results from the interaction of attractive and repulsive surface forces.

The magnesium ions contained in sea water have a particularly detrimental effect on the performance of PHPA in sea water. This often necessitates the cumbersome hauling of fresh water to drilling sites that are contaminated by sea water or chemical treatment of the magnesium ions ("treating out") in the contaminated drilling fluid by chemical treatment. Lime or caustic is generally added to treat out magnesium ions in the drilling fluid. Other limitations of the PHPA drilling fluid additive include sensitivity to low gravity reactive solids and thermal instability above 300° F.

Biopolymers comprise another group of additives including, for example, xantham gum, and guar gum, which also have limiting factors. These deficiencies, the foremost of which are biodegradation and thermal decomposition beginning at a temperature as low as 200° F., result from their composition. The use of such biopolymers in sea water muds may result in intolerably high levels of viscosity.

It is quite obvious that the deficiencies of current drilling fluid systems create a need for a new generation polymer system which addresses many of these problems.

The drilling fluid of this invention, which includes the novel water soluble polymer of this invention provides more effective control of the viscosity, gel strength and fluid loss associated with salt, divalent cation, and electrolyte contaminated systems frequently encountered during well drilling. Likewise, the drilling fluid of this invention operates normally in the neutral pH range of 7-10 and operates favorably in a high alkaline environment, i.e., pH of 10-12 or greater.

The aqueous based drilling fluid and water soluble polymer of this invention effectively control the viscosity, gel strength and fluid loss of an aqueous drilling fluid when exposed to high temperatures.

The aqueous based drilling fluid and water soluble polymer of this invention will, likewise, effectively control the viscosity, gel strength and fluid loss of an aqueous drilling fluid which becomes contaminated with low gravity solids or contains high gravity solids such as barium sulfate. The aqueous based drilling fluid and water soluble polymer of this invention will produce flat instantaneous gel strengths to suspend solids, especially in a deviated or horizontal wellbore thus preventing or minimizing the formation of a cuttings bed. Furthermore, the drilling fluid of this invention will maintain viscosity, or relatively high shear stress values in the low shear rate range thereby increasing the carrying capacity of the drilling fluid under such conditions.

By better controlling the adverse effects of conditions frequently encountered during drilling operations, it is the general objective of the drilling fluid of this invention to obtain a superior degree of borehole stabilization, rheological and supplemental filtration control, and environmental acceptability.

2. The Prior Art

Prior art which is material to the concept of this invention include U.S. Pat. Nos. 3,039,529; 4,076,628; 4,146,690; 4,482,682 and Journal of Applied Polymer Science, Vol. 26, pg. 1117 (1981). Also, U.S. Pat. No. 4,812,544 discloses one or more of the polymers used in the drilling fluid of this invention although there is no effective disclosure of a drilling fluid or incorporation of the polymer into a drilling fluid.

SUMMARY OF THE INVENTION

This invention relates to an improved water based drilling fluid and even more specifically to novel water soluble polymers that can be added to the drilling fluid to provide desirable performance characteristics. In its broadest form the drilling fluid of this invention includes: an aqueous continuous phase; a water soluble polymer; a weighting agent and a gelling agent. Other additives may be incorporated into the drilling fluid system of this invention in order to provide desired performance characteristics to the drilling operations.

This invention also relates to a water soluble polymer and method for its preparation. The water soluble polymer drilling fluid additive of this invention exhibits improved tolerance of salts, divalent cations, solids and elevated temperatures when used as an additive in aqueous drilling fluids. The polymer additive is characterized by increased viscosity at low shear rates and improved fluid loss control thereby exhibiting more manageable rheological and thixotropic properties. The improved properties better facilitate use of the drilling fluid additives of this invention in sea water, other highly contaminated drilling fluid systems, and at elevated temperatures.

Essential monomers comprising precursors of the polymer additive of this invention are 2-acrylamido-2-methyl propane sulfonic acid ("AMPS" is a trade name of the Lubrizol Corp.) and N,N-dimethylacrylamide. Addition of styrene sulfonic acid and acrylamide may be used to enhance the functional characteristics depending upon the use of the polymer.

This additive is prepared by polymerizing various combinations of the above monomers in various ratios ranging from 0% to 75% by weight of each of the monomers. Other materials are added to enhance the functional characteristics of the drilling fluid additive. The method of this invention includes the mixing of monomers and polymerization of that mixture.

DETAILED DESCRIPTION OF THE PREFERRED EMBODIMENT

A variety of addtives can be included in the aqueous based drilling fluid of this invention. Specifically, materials generically referred to as gelling materials ("gelling agent"), thinners and fluid loss control agents are typically added to aqueous based drilling fluid formulations. Of these additional materials each can be added to the formulation in a concentration as rheologically and functionally required by drilling conditions. Typical of gelling agents used in aqueous based drilling fluids are high molecular weight polymers such as PHPA, biopolymers, bentonite and salt gel. Examples of biopolymers are guar gum, starch and the like.

Similarly, it has been found beneficial to add lignosulfonate as thinners for aqueous based drilling fluids. Typically lignosulfonates, modified lignosulfonates, polyphosphates and tannins are added. In other embodiments low molecular weight polyacrylates can also be added as thinners. Thinners are added to a drilling fluid to reduce flow resistance and gel development. Other functions performed by thinners include to reduce filtration and cake thickness, to counteract the effects of salts, to minimize the effects of water on the formations drilling, to emulsify oil in water, and to stabilize mud properties at elevated temperatures.

The water based drilling fluid of this invention additionally includes a weighting material, sometimes referred to as a weighting agent. The type and quantity of weighting material depends upon the desired density of the final drilling fluid composition. The preferred weight materials include, but are not limited to: barite, iron oxide, calcium carbonate, combinations of such materials and derivatives of such materials. The weight material is typically added in a quantity to result in a drilling fluid density of up to 24 pounds per gallon, preferably up to 21 pounds per gallon and most preferably up to 19.5 pounds per gallon.

Finally, fluid loss control agents such as modified lignite, polymers and modified starches and cellulose and sized material such as $CaCO_3$ or salt can be added to the aqueous based drilling fluid system.

Suitable compositions of the polymer prepared according to this invention can result in a wide variety of products. Among the possible uses and applications contemplated are: surface active materials; polyvalent metal sequestrants; scale inhibitors; antioxidant compositions; hydraulic cement and concrete water control, set time, and air-entraining admixtures; clay and mineral pigment dispersants; latex suspension stabilizers; adhesives; herbicide and pesticide carrier formulations; thermoplastic and thermosetting resins; elastomers; binders for cellulose, wood and synthetic fiber composites; slip additives in ceramic arts; foundry casting mold binders; water clarifying polymers; surfactant additives for secondary and tertiary oil recovery water floods; photosensitive materials; protein denaturants; leather tanning and conditioning agents; light-screening polymers; metal substantive cements and coatings; pigments, toners and developers for photoelectric reproduction and copying systems; ion exchange and active catalyst-binding polymers; dyeing and coloring agents; trace-nutrient carriers for agriculture; heavy metal scavenging polymers for soluble nuclear waste; enhancement in moisture permeability, antistatic properties, dyeability, and "hand" of synthetic fibers and fabrics; corrosion inhibiting copolymers; metal cleaning compositions; flotation and separation agents in ore and mineral beneficiation; as well as numerous additional useful applications which will be apparent to those skilled in various specialized areas within the polymer arts.

The polymers prepared according to this invention are especially effective as additives for aqueous drilling fluids used during rotary drilling operations in highly contaminated systems. Functional characteristics of the drilling fluid containing this additive are relatively less affected by contaminants and high temperatures. Ions towards which polymers prepared according to this invention exhibit outstanding tolerance specifically include sodium chloride, and calcium, magnesium and other divalent cations frequently encountered in sea water drilling fluids. Thus, the new polymer additive of the present invention comprises a highly effective additive for drilling fluids used for aqueous drilling operations in alkaline conditions.

The new polymer additive is particularly tolerant of cations such as magnesium and calcium, which are generally representative of a sea water environment. This tolerance is manifested by the excellent solubility of the polymer in sea water. Unexpectedly, the polymer additive of this invention demonstrates superior viscosifying properties, even in saturated calcium chloride and sodium chloride and other brines.

The polymer additive of this invention is also tolerant of hydroxyl radicals, remaining relatively unaffected by pH levels in the drilling fluid ranging from 7 to as high as 12. It is also compatible with acidic environments down to a pH of 0.50. The preferred range is 7.5 to 9.

Alkalinity of a drilling fluid is controlled by the use of sodium, potassium or calcium hydroxide. Both cationic components and the anionic component of sea water are major inhibitors preventing the osmotic hydration of the reactive gumbo. Calcium ion, which can be provided by the addition of calcium hydroxide or calcium chloride, becomes the prevalent cationic inhibiting component if greater alkalinity is required.

In its preferred form the water soluble polymer additive of this invention is a polyfunctional sulfonated polymer with a molecular weight of approximately 2 to 7 million. Due to its polyfunctional sulfonated nature, the additive is sea water soluble and capable of tolerating calcium levels as high as 25% by weight of a $CaCl_2$ brine.

The new additive is also tolerant of low gravity solids permitting superior manageability of rheological and thixotropic properties. This drilling fluid additive consequently provides excellent filtration control. It is environmentally acceptable due to its resulting low level of toxicity.

In addition, the aqueous drilling fluid of this invention when utilizing the polymer additive of this invention exhibits better hole stability due to low rates of swelling after long term exposure to an aqueous phase. Further, drilling fluids containing this polymonic additive exhibits better hole cleaning capabilities resulting from its performance in the low shear rate range.

The carrying capacity of this drilling fluid increases as shear rate decreases. The drilling fluid additive of this invention maintains viscosity in the low shear rate range, i.e., normally reflected by a corresponding Fann Dial Reading ("FDR") of less than 100 rpm. Carrying capacity of the polymer additive increases as the shear rates decrease indicating decreasing "N" values. "N" values, derived from the formula $\log FDR_1 - \log FDR_2$ divided by $\log RPM_1 - \log RPM_2$, vary significantly over the shear rate range of a drilling fluid. The additive of this invention sustains viscosity as a shear thinning fluid to a minimum temperature of 350° F.

It is contemplated that the polymer additive of this invention should achieve high penetration rates due to its stabilization effect.

The water soluble polymer can function either competitively to or in support of high molecular weight polymer. The polymer additive is also compatible with currently available products that commonly comprise components of drilling fluid systems.

In synthesizing polymers which have utility in the product and process of this invention, AMPS and N,N-dimethylacrylamide comprise essential precursor components of the additive polymers. The precise percentage of AMPS and N,N-dimethylacrylamide present in the drilling fluid additive formulation will vary depending on the intended end use of the drilling fluid, the particular drilling formation, and other factors. AMPS and N,N-dimethylacrylamide are essential precursor monomers comprising a major portion by weight of the drilling fluid additive in most preferred embodiments.

Most preferred embodiments of this invention will also contain acrylamide to enhance the functional characteristics of the drilling fluid polymer additive. Other monomers, such as acrylamide and styrene sulfonic acid, may also be added to the combination of monomers polymerized. As additional monomers are added to the formulation, percentages of each individual monomer will vary depending on the end use of the product.

It has been found that the copolymer additives of this invention should comprise between about 25 to 75% by weight of AMPS and between about 0.5% and about 50% by weight of N,N-dimethylacrylamide. The polymers also preferably contain an acrylamide monomer in an amount up to about 60% by weight, and may also contain styrene sulfonic acid monomer in an amount up to about 25% by weight. In each case the several monomers are reacted together to form the copolymer additive.

It is contemplated that copolymerization of sulfonated and non-ionic monomers other than the specific monomers identified above may be used, depending on the specific use of the drilling fluid containing the mud additive. Other suitable N-substituted acrylamides include: alkylacrylamides, N-methanol, N-isopropyl, diacetone-acrylamide, N-alkyl acrylamide (where alkyl is $C_1$ to $C_{14}$), N,N-dialkyl acrylamides (where alkyl is $C_1$ to $C_{14}$), N-cycloalkane acrylamides, combinations of the above and related compounds.

Other suitable substituted sulfonic acids useful in place of or together with AMPS include other unsaturated sulfonated monomers, for example, sulfoethylmethacrylate, vinylsulfonate and related compounds.

Still other monomers which may be incorporated in the copolymer additives of this invention include alkylacrylates and methacrylates (alkyl chain from $C_1$ to $C_{14}$), isobornylmethacrylate, isobornylacrylate and related compounds.

In another aspect, the invention comprises drilling fluid systems or compositions which contain the copolymer additives described above. Typical compositions of the invention may contain between about 0.01 and 10 percent by weight of the additive. It is particularly preferred that the mud composition contain about 0.1 and 3.0 percent by weight of the drilling fluid additive prepared according to this invention.

In addition to a copolymer additive of the invention, the mud systems of the invention may also preferably contain one or more dispersants such as a polyacrylate, lignin, modified lignin, or lignite, chrome lignosulfonate. Dispersants are added to drilling fluid to reduce flow resistance and gel development. Dispersants are also added to reduce filtration and cake thickness, to counteract the effect of salts, to minimize the effects of water on the formations drilled, to emulsify oil and water, and to stabilize drilling fluid properties at elevated temperatures.

A variety of polymerization systems may be employed in practicing the present invention, such as solution polymerization, precipitation polymerization and emulsion polymerization. Solution polymerization is carried out either in water or in an organic solvent. The resulting copolymer is isolated by distilling off the solvent or by precipitation. Precipitation is accomplished by adding a miscible organic solvent in which the copolymer is insoluble. Examples of suitable solvents are acetone, methanol, and other hydrocarbons.

The use of precipitation results in the preparation of the monomers of this invention in an organic solvent in which the monomers are soluble but the polymer is insoluble. In this precipitation polymerization process, the copolymer separates as a solid as polymerization occurs. The polymer can be isolated either by filtration or by distilling off the solvent. Final drying is accomplished by conventional means.

The precursor monomers which are polymerized to form the drilling fluid additive of this invention are commercially available from a number of suppliers. AMPS, for example, is supplied by the Lubrizol Company. N,N-dimethylacrylamide may be obtained from a variety of commercial sources. Acrylamide and styrene sulfonic acid are available from other major chemical companies for example, Dow Chemical Company and American Cyanamid.

The third method for polymerization is emulsion polymerization. Preparation of the polymers of this invention in an emulsion involves emulsifying the aqueous solution of monomers in a water immiscible organic solvent such as cyclohexane, toluene or the like. Emulsification is accomplished by addition of 0.5% to 8%, preferably 1% to 4%, of a suitable water in oil type of emulsifier. An emulsion is a substantially permanent, heterogeneous liquid mixture of two or more liquids which do not normally dissolve in each other but which are held in suspension, one in the other, by small amounts of additional substances known as "emulsifiers." These emulsifiers modify the surface tension of the droplets to keep them from coalescing. Surface active agents are good emulsifiers. Typical among these are quaternary ammonium compounds, sulfonated oils, and polyhydric alcohol esters and ethers.

Polymerization is accomplished by addition of a suitable free radical initiator. This initiator may be either water soluble or oil soluble. Examples of free radical initiators used are azo compounds, benzoyl peroxide, azobisisobutyronitrile, azobix (2-amidinopropane) dihydrochloride. In addition, inorganic peroxy compounds such as ammonium persulfate, sodium persulfate or potassium persulfate are used. If necessary, the inorganic peroxy compounds can be used in combination with sodium or potassium metabissulfite. As a general rule, 0.1 to 15 grams of free radical initiator is used per 100 grams of total monomer.

EXAMPLES

The following examples establish that the polymer drilling fluid additive of this invention exhibits superior rheological and thixotropic properties in a thermally elevated, sea water, or other contaminated environment.

The polymer additive evaluated in these examples was formed according to the emulsion polymerization method described herein and in accordance with the teachings of U.S. Pat. Nos. 4,171,296 and 4,230,608 which are incorporated herein by reference. The polymer in these examples was produced by reacting precursor monomers in the proportions as follows:

| a. | AMPS | 70% By Weight |
|---|---|---|
| b. | Acrylamide | 25% By Weight |
| c. | N,N-dimethylacrylamide | 5% By Weight |
| | | 100% By Weight |

This polymer additive was subjected to various conditions by simulating components, dynamics and temperatures which might be encountered during drilling operations. The particular components of the simulated drilling fluid, shearing times, and aging conditions used in the examples were designed to evaluate the relative tolerance of drilling fluids containing the polymer additive over the range of conditions which might naturally occur.

The various components, shearing rates, and temperatures represent conditions that often detrimentally affect the performance of a mud. Certain quantities of a particular component were selected to correspond with the greatest amount of that component that might naturally be encountered during drilling operations. Accordingly, these performance evaluations are designed to determine the functionality of a fluid containing this polymer when immersed in the worst of adverse conditions. In example 1, for instance, a large amount of calcium chloride was included in the drilling fluid to observe the rheology of the fluid when exposed to 20,000 mg/l of calcium ions.

The components of the simulated drilling fluids of the examples are readily supplied by a variety of manufacturers. For example, modified starch is available from M-I Drilling Fluids as the proprietary product, THERM PAC. REV DUST, a trade name for calcium montmorillite, is distributed by the Milwhite Corporation. Salt gel is also commonly known as attapulgite.

The components of the drilling fluids evaluated in the examples are listed in the order by which they are added in the procedural scheme outlined immediately preceding the corresponding table. Shearing was conducted by a Hamilton Beach mixer for the time periods indicated in the procedures described below.

The aging of the drilling fluid in the examples was performed in an oven at the temperature and the dynamic state specified. Static aging of course involved no induced dynamic. The rolling and rotating were produced by placing the fluid in a cylindrical stainless steel aging cell which was either "rolled" about an axis or "rotated" end to end as indicated. The viscosity or rheology of the muds were then analyzed by measuring and recording the FDRs of the muds at 75° F. at the rpm indicated in the far left vertical column.

In the tables following the procedure for formulating the drilling fluids analyzed, the Fann dial readings of unaged and aged samples are recorded opposite the Fann viscometer simulating shear rates to which they correspond. The FDR is a function of the viscosity of the mud. As discussed previously, the plastic viscosity and yield point reflect the viscosity of the fluid.

The two viscosity indices are derived from the Fann viscometer readings at 600 and 300 rpm. The plastic viscosity constitutes the difference between the Fann dial reading at 600 rpm and 300 rpm and the yield point represents the difference between the Fann dial reading at 300 rpm and the plastic viscosity. Generally, increase in the plastic viscosity and yield point values are proportional to increases of the drilling fluid density but the yield point increases by a smaller magnitude.

Examples 1 and 2 provide data comparisons of the viscosifying performance of drilling fluids containing the additive of this invention with muds containing PHPA. After adding these two polymers to identically composed muds, Fann dial readings of the unaged and aged samples were performed at the rpm rates designated in the far left vertical column.

Data comparing the gel strength of muds containing the new additive as opposed to PHPA are also included in the tables of Examples 1 and 2. As indicated in those tables, gel strength, marked as "gels", was measured at a 10 second and then at a 10 minute interval, with a Fann viscometer set at 3 rpm.

In Example 1,287.0 grams of water was added to 16.4 grams of 98% by weight calcium chloride resulting in a concentration of 20,000 mg/l of calcium ions. The solution was treated with 4.0 grams of 30% active material of either the additive of this invention or PHPA polymer and sheared on a Hamilton Beach mixer for 10 minutes.

After shearing, the mixture was treated with 0.25 grams of lime, and 2.0 grams of salt gel and 2.0 grams of modified starch were added. The solution was then treated with 50.0 grams of bentonite, and 143.0 grams of barite were added. A portion of the muds was aged in an oven for 16 hours at 250° F. in cells rotating end-to-end while others were not aged. The viscosity of the aged and unaged samples of the drilling fluids were measured with a Fann viscometer, recorded and compared.

The data comparison revealed that the mud containing the new polymer exhibited higher FDRs when compared to the corresponding FDRs of the mud containing PHPA. This establishes that drilling fluids containing the additive of this invention exhibit more improved viscosifying properties than muds containing PHPA, particularly in the aged samples. Of particular significance is the comparatively improved viscosity of the new additive at low shear rates. As previously noted, maintaining carrying capacity and sufficient thixotrophy is a much needed functional property in maintaining borehole stability. The comparative gel strength data further establishes improved gel strength of muds containing the new additive as reflected by the higher FDRs of the new polymer.

In Example 2, first, 290.0 grams or 287 milliliters of calcium chloride brine, containing a concentration of 5000 mg/l of calcium ions, was treated with 0.25 grams of lime and in a second run treated with 1.0 grams of lime. Second, the mixture was then sheared on a Hamilton Beach mixer for 1 minute. Third, 4.0 grams of 30% active material of the polymer of this invention was added to each mixture, sheared again for 4 minutes and 3.0 grams of salt gel was then added. After shearing this fluid for 5 additional minutes, 2.0 grams of modified starch and 153.0 grams of barite were then added. Fifth, the mixture was then sheared for 10 more minutes. Finally, the fluid was contaminated with bentonite and REV DUST, a commercial product simulating low gravity solids. A portion of both of the muds in Example 2 were then heat aged for 16 hours at 150° F. in capped cells rolling about their axis in a circular motion.

The tables of Example 2 also establish that the mud samples containing the polymer additive of this invention have improved viscosity. In contrast to the former example the tables demonstrate no variation in viscosity due to pH differences.

In Example 3, first, 4.2 grams of 98.0% calcium chloride was combined with 295.0 grams of synthetic sea water. Second, this mixture was divided in two portions, one to which 4.0 grams of the new polymer was added before 2.0 grams of lime and the other to which 2.0 grams of lime were added before 4.0 grams of the new polymer. After the mixture was sheared for 5 minutes, it was then treated with 2.0 grams of modified starch, 3.0 grams of salt gel or attapulgite, and 144.0 grams of barite. The composition was sheared for 10 minutes, then contaminated with 35.0 grams of bentonite and contaminated with 20.0 grams of REV DUST. Portions of both samples were then heat aged for 16 hours at 250° F. in a static position.

The synthetic sea water was utilized in Example 3 to introduce magnesium ions. The high quantity of magnesium ions present in sea water detrimentally affects the viscosity of drilling fluids, particularly those containing PHPA additive. To evaluate the affect of magnesium ions on muds containing the new polymer, portions of the mud wherein the magnesium ions were treated as opposed to untreated were compared. That is, by adding lime before the polymer the magnesium ions in the synthetic sea water were neutralized. In the second batch containing identical proportions of the respective additives, the mud was not treated with lime and the magnesium ions not precipitated before the polymer was added. The viscosity of the treated and untreated portions of mud were then analyzed by use of Fann dial readings at the incrementally descending rpm rates specified in the tables.

The data comparison establishes that although the mud treated with lime showed superior viscosity, the untreated mud nonetheless performed satisfactorily and has improved magnesium tolerance. Thus, unlike PHPA and other water soluble additives, the polymer of this invention may be utilized in drilling operations contaminated by sea water without the addition of fresh water.

The last table, in Example 4, depicts the fluid loss associated with the incrementally increasing concentrations of the polymer additive of this invention indicated in the table. These results were derived from performing the American Petroleum Institute test previously described. In this procedure the drilling fluid, filter paper, and a screen are inserted in a cell with an upper orifice. Air is then introduced into the vessel through the orifice at 100 psi. The fluid loss is measured for either a half hour or seven and one half minutes and doubled and the volume of the drilling fluid filtrate is measured.

In contrast to the higher amount of fluid loss associated with muds containing PHPA, the fluid loss of the drilling fluids of Example 4, which contain the new polymer, was reduced. This manifests that the new polymer will have an inhibitive effect on swelling and dispersion often associated with drilling operations utilizing a water soluble drilling fluid.

| EXAMPLE 1 |
| --- |
| Procedure for Preparation of the Drilling Fluid |

1. Combine the following:

| | |
| --- | --- |
| $H_2O$ | 287.0 grams |
| 98% $CaCl_2$ | 16.4 grams |
| (20,000 mg/l $Ca^{++}$) | |
| Polymer | 4.0 grams |

2. Shear 10 minutes.
3. Add the following:

| | |
| --- | --- |
| Lime | 0.25 grams |
| Salt Gel | 2.0 grams |
| THERM PAC | 2.0 grams |
| Bentonite | 50.0 grams |
| Barite | 143.0 grams |

4. Shear 30 minutes.
5. Heat Age a portion of both samples for 16 hrs @ 250° F./Rotating.
6. Perform the Fann dial readings at the rpm rates indicated in the far left vertical column below.

EXAMPLE 1
Procedure for Preparation of the Drilling Fluid

| | NEW POLYMER | | | PHPA | | |
|---|---|---|---|---|---|---|
| | Unaged | | Aged | Unaged | | Aged |
| RPM | 75F | 75F | 120F | 75F | 75F | 120F |
| 600 | 111 | 76 | 49 | 42 | 37 | 28 |
| 300 | 62 | 42 | 28 | 26 | 22 | 15 |
| 200 | 47 | 32 | 22 | 20 | 15 | 12 |
| 100 | 32 | 22 | 16 | 14 | 10 | 9 |
| 6 | 17 | 10 | 9 | 11 | 5 | 5 |
| 3 | 17 | 10 | 9 | 10 | 5 | 5 |
| Plastic Viscosity/ Yield Point | 49/13 | 34/8 | 21/7 | 16/10 | 15/7 | 13/2 |
| Gels 10 secs/ 10 mins | 21/29 | 13/18 | 13/18 | 14/29 | 8/10 | 8/10 |

EXAMPLE 2
Procedure for Preparation of the Drilling Fluid

1. Combine the following:
   - CaCl₂ Brine (5000 mg/l Ca⁺⁺): 290.0 grams (287 ml)
   - Lime: 0.25 & 1.0 grams
2. Shear 1 min
3. Add Polymer: 4.0 grams
4. Shear 4 min
5. Add Salt Gel (attapulgite): 3.0 grams
6. Shear 5 min
7. Add Modified Starch: 2.0 grams
8. Add Barite: 153.0 grams
9. Shear 10 min
10. Add the following:
    - Bentonite: 35.0 grams
    - REV DUST: 20.0 grams
11. Heat age a portion of both samples for 16 hrs @ 150° F./Rolling.
12. Perform the Fan dial readings at the rpm rates indicated in the far left vertical column below:

| | NEW COPOLYMER | | | |
|---|---|---|---|---|
| | 0.25 lime | | 1.0 lime | |
| RPM | Unaged | Aged | Unaged | Aged |
| 600 | 111 | 90 | 67 | 88 |
| 300 | 68 | 54 | 38 | 54 |
| 200 | 53 | 42 | 29 | 41 |
| 100 | 38 | 30 | 19 | 28 |
| 6 | 23 | 15 | 8 | 14 |
| 3 | 25 | 16 | 8 | 14 |
| Plastic Velocity/ Yield Point | 43/25 | 36/18 | 29/9 | 34/20 |
| Gels 10 secs/ 10 mins | 24/46 | 14/34 | 5/11 | 13/25 |

EXAMPLE 3
Procedure for Preparation of the Drilling Fluids

1. Combine the following:
   - Synthetic Sea H₂O: 295.0 grams (287 cc)
   - 98% CaCl₂ (5000 mg/l Ca⁺⁺): 4.2 grams
2. Add either
   - Polymer, first: 4.0 grams
   - Lime, second; or: 2.0 grams
   - Lime, first: 2.0 grams
   - Polymer, second: 4.0 grams
3. Shear 5 minutes.
4. Add the following:
   - Modified Starch: 2.0 grams
   - Salt Gel (attapulgite): 3.0 grams
   - Barite: 144.0 grams
5. Shear 10 minutes.
6. Add the following components:
   - Bentonite: 35.0 grams
   - REV DUST: 20.0 grams
7. Heat age a portion of both samples for 16 hrs @ 250° F./Static.
8. Perform Fann dial readings at the rpm rates indicated at the far left vertical column below.

| | **POLYMER LINE | | **LIME POLYMER | |
|---|---|---|---|---|
| RPM | Unaged | Aged | Unaged | Aged |
| 600 | 74 | 54 | 92 | 71 |
| 300 | 39 | 27 | 50 | 37 |
| 200 | 28 | 19 | 36 | 27 |
| 100 | 16 | 10 | 23 | 17 |
| 6 | 5 | 3 | 10 | 7 |
| 3 | 5 | 3 | 10 | 7 |
| Plastic Velocity/ Yield Point | 35/4 | 27/0 | 42/8 | 34/3 |
| Gels 10 secs/10 mins | 7/19 | 3/19 | 11/24 | 7/19 |

**Order in which lime and polymer added to mixture

EXAMPLE 4
EFFECT OF CONCENTRATION ON FLUID LOSS

| COPOLYMER | AGING TEMP | ADDITIVE USED (#/bbl) | API FLUID LOSS (ml) |
|---|---|---|---|
| Reaction Product of: 70% AMPS 5% N,N-dimethylacrylamide 25% Acrylamide | 16 hrs @250° F. | 0.0 | 119 |
| | | 0.5 | 110 |
| | | 1.0 | 102 |
| | | 2.0 | 87 |
| | | 3.0 | 75 |
| | | 4.0 | 63 |
| | | 6.0 | 46 |
| | | 8.0 | 33 |

As a whole, the tables depicting the rheology of the drilling fluid additive of this invention in the examples above demonstrate the superior rheological and thixotropic properties of drilling muds containing the polymer additive of this invention. The above tables establish that the additive produced by polymerizing the above monomers improves the viscosity of the fluids, particularly at low shear rates, and fluid loss of the drilling fluid when subjected to elements and conditions which adversely affect the performance of water base muds. The examples above demonstrate that the polymer additive of this invention improves the carrying capacity, thixotropy and fluid loss control of a drilling fluid system when exposed to such factors.

What is claimed is:

1. An improved water based drilling fluid, said drilling fluid consisting of:
   a. an aqueous continuous phase;
   b. a water soluble polymer, said polymer being the reaction product of:
      i. 25-75% by weight of 2-acrylamido-2-methyl propane sulfonic acid
      ii. 0.5-50% by weight N,N-dimethylacrylamide
      iii. up to 60% by weight acrylamide; and
      iv. up to 25% by weight styrene sulfonic acid;
   c. a gelling agent selected from the group consisting of PHPA, biopolymers, bentonite, salt gel and combinations thereof; and
   d. inorganic additives; said inorganic additives comprising a weighing agent selected from the group consisting of: barite, iron oxide, calcium carbonate and combinations thereof.

2. An improved water based drilling fluid, said drilling fluid consisting of:
   a. an aqueous continuous phase;
   b. a water soluble polymer, said polymer being the reaction product of:
      i. 25-75% by weight of 2-acrylamido-2-methyl propane sulfonic acid
      ii. 0.5-50% by weight N,N-dimethylacrylamide
      iii. up to 60% by weight acrylamide; and
      iv. up to 25% by weight styrene sulfonic acid;
   c. a gelling agent selected from the group consisting of PHPA, biopolymers, bentonite, salt gel and combinations thereof; and
   d. non-polymeric additives; said non-polymeric additives comprising a weighing agent selected from the group consisting of: barite, iron oxide, calcium carbonate and combinations thereof.

3. An improved water based drilling fluid, said drilling fluid consisting of:
   a. an aqueous continuous phase;
   b. a water soluble polymer, said polymer being the reaction product of:
      i. 25-75% by weight of 2-acrylamido-2-methyl propane sulfonic acid
      ii. 0.5-50% by weight N,N-dimethylacrylamide; and
      iii. up to 60% by weight acrylamide;
   c. a gelling agent selected from the group consisting of PHPA, biopolymers, bentonite, salt gel and combinations thereof; and
   d. inorganic additives; said inorganic additives comprising a weighing agent selected from the group consisting of: barite, iron oxide, calcium carbonate and combinations thereof.

4. An improved water based drilling fluid, said drilling fluid consisting of:
   a. an aqueous continuous phase;
   b. a water soluble polymer, said polymer being the reaction product of:
      i. 25-75% by weight of 2-acrylamido-2-methyl propane sulfonic acid
      ii. 0.5-50% by weight N,N-dimethylacrylamide; and
      iii. up to 60% by weight acrylamide;
   c. a gelling agent selected from the group consisting of PHPA, biopolymers, bentonite, salt gel and combinations thereof; and
   d. non-polymeric additives; said non-polymeric additives comprising a weighing agent selected from the group consisting of: barite, iron oxide, calcium carbonate and combinations thereof.

* * * * *